J. L. WHEELER.
SPEED CONTROLLER AND INDICATOR.
APPLICATION FILED MAR. 21, 1914.
1,134,026.
Patented Mar. 30, 1915.
3 SHEETS—SHEET 1.
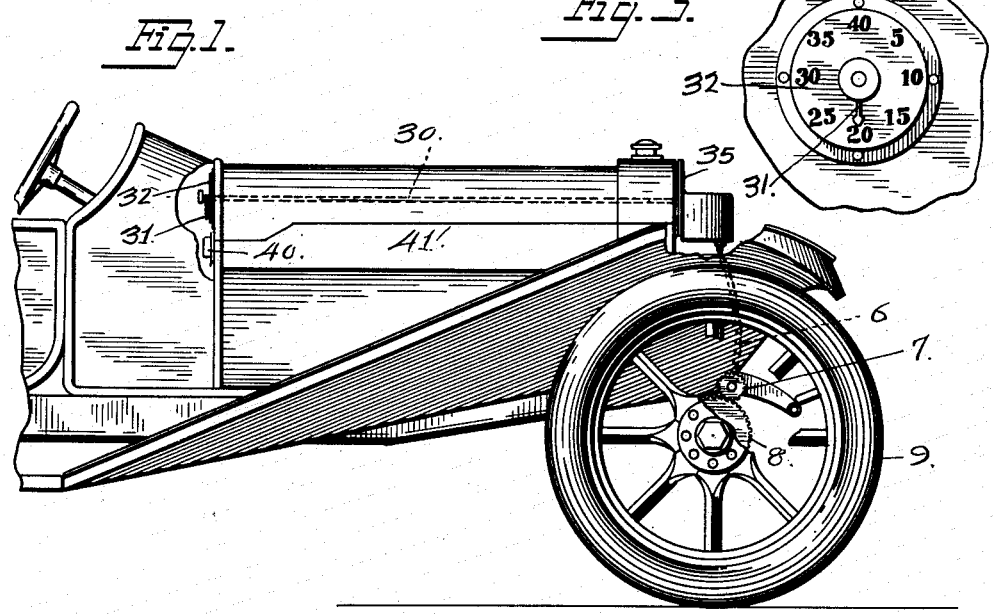
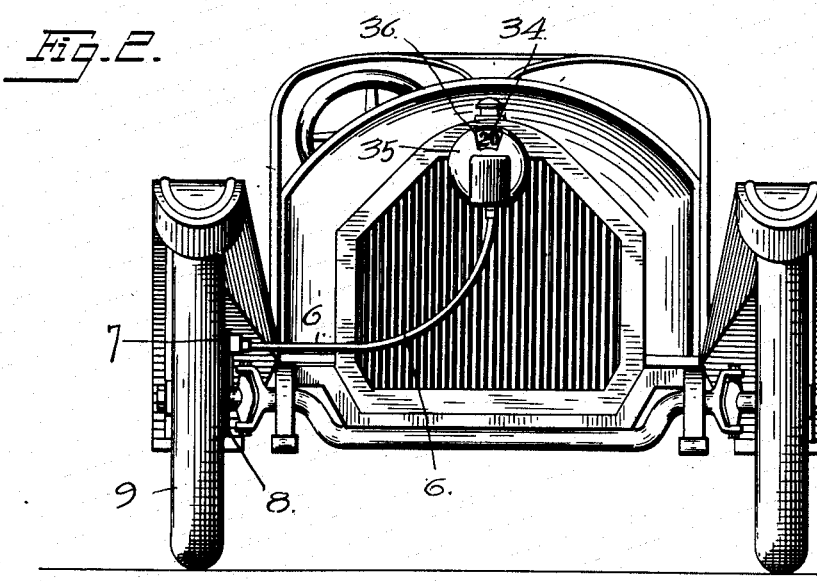
Witnesses
Karl F. Schutz
Geo. Kromrey
Inventor
John L. Wheeler.
By Arthur L. Slee
HIS ATTY.

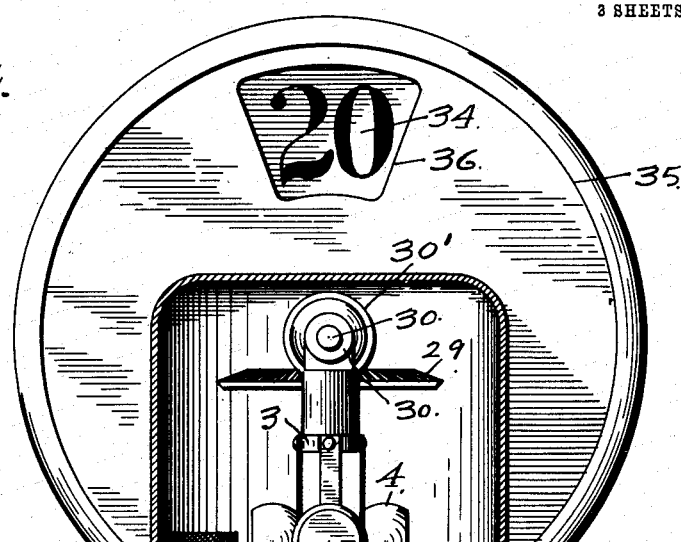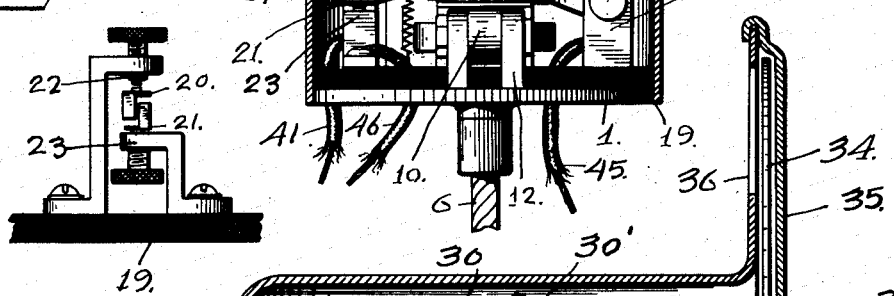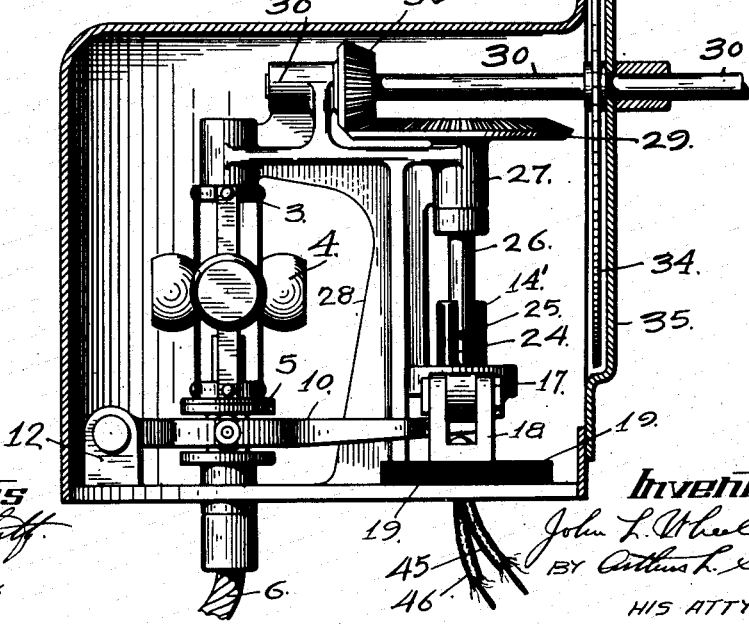

J. L. WHEELER.
SPEED CONTROLLER AND INDICATOR.
APPLICATION FILED MAR. 21, 1914.
1,134,026.
Patented Mar. 30, 1915.
3 SHEETS—SHEET 3.
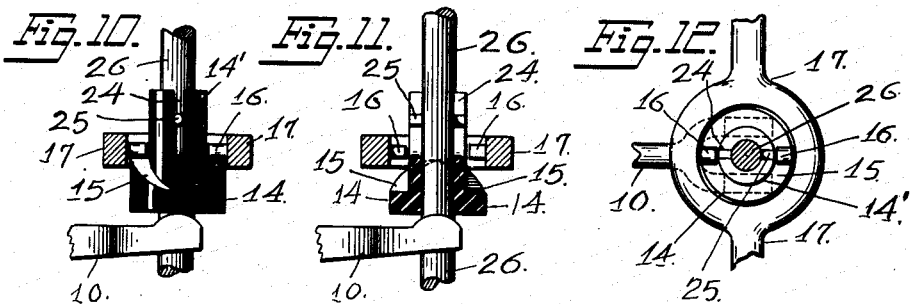
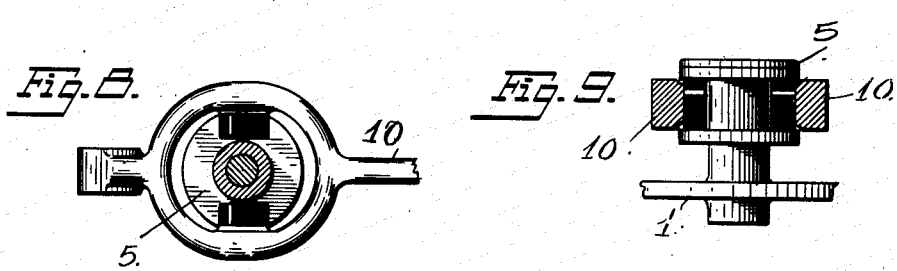
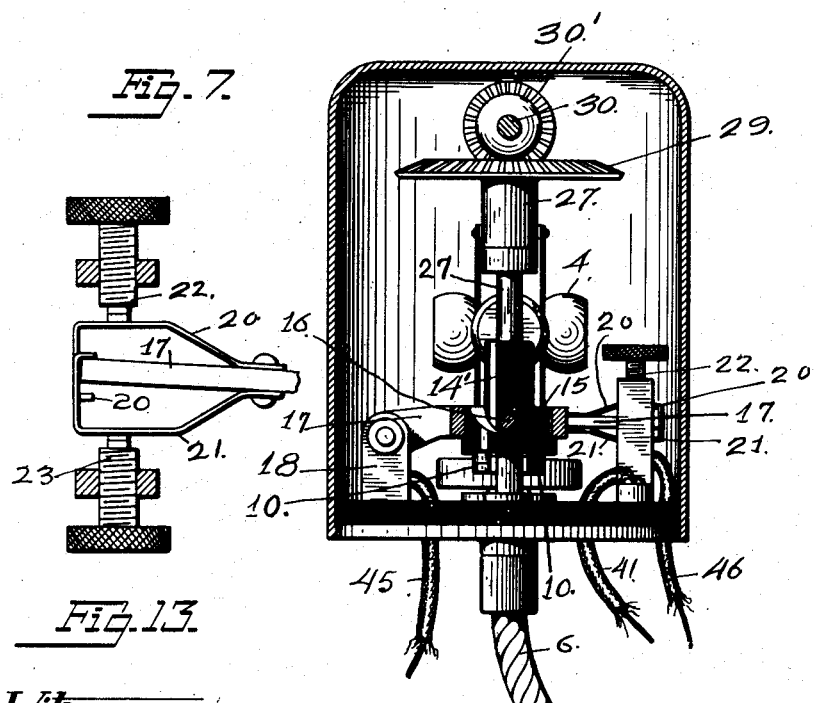
Witnesses
Inventor
John L. Wheeler.
By Arthur L. Slee
HIS ATTY.

UNITED STATES PATENT OFFICE.

JOHN L. WHEELER, OF NAPA, CALIFORNIA.

SPEED CONTROLLER AND INDICATOR.

1,134,026. Specification of Letters Patent. Patented Mar. 30, 1915.

Application filed March 21, 1914. Serial No. 826,398.

*To all whom it may concern:*

Be it known that I, JOHN L. WHEELER, a citizen of the United States, residing in the city and county of Napa and State of California, have invented a new and useful Improvement in Speed Controllers and Indicators, of which the following is a specification.

My invention relates to speed governors or controllers and indicators wherein a governor is driven directly from one of the wheels of the vehicle and operates adjustable mechanism adapted to interrupt the electrical circuit to the spark plugs when the velocity of the vehicle to which the governor is attached exceeds a predetermined speed, and wherein a number is displayed conspicuously to indicate the speed for which the governor or controlling means is set, and the objects of my invention are first, to provide means for breaking the spark plug circuit when the speed of the vehicle reaches a given velocity; second, to sound an alarm which will indicate to the driver of the vehicle that he has reached the indicated speed or a greater one; third, to provide adjustable means for regulating the speed at which the vehicle may travel before the spark plug circuit is broken or the alarm sounded; and fourth, to provide means whereby a conspicuous indication is displayed of the speed for which the controller is set. I accomplish these several features by means of the device illustrated in the drawings forming a part of the present specification wherein like characters of reference are used to designate similar parts throughout the said specification and drawings and in which—

Figure 1 is a broken side elevation of the front portion of an automobile disclosing the device secured thereto and the manner in which the same is connected, by means of a flexible drive shaft, to one of the wheels of the vehicle. Fig. 2 is a front view of the vehicle disclosing the device secured thereto and the manner in which a number is conspicuously displayed which indicates the number of miles per hour at which the device is set to interrupt the spark circuit. Fig. 3 is an enlarged broken view of the indicator disk on the dash board and an arm connected to the controlling device which indicates to the driver the number of miles per hour for which the device is set. Fig. 4 is a front view of the controlling mechanism with the front portion of the housing removed. Fig. 5 is a side elevation of Fig. 4 with the housing shown in section. Fig. 6 is a detailed view of the contact points for making and breaking the circuit to the alarm and the circuit to the spark plugs. Fig. 7 is a rear sectional view partly in section in order to disclose the adjustable means whereby the speed for which the device is set may be adjusted. Figs. 8 and 9 are broken detailed views of the operating lever and the manner in which the same is secured to and insulated from the sleeve of the governor. Fig. 10 is a broken detailed view of the circuit controlling lever, the operating lever and the adjustable insulated sleeve which regulates the distance between the said levers, the said sleeve being shown in its lower position or as set for the minimum speed. Fig. 11 is a view similar to Fig. 10 wherein the adjustable sleeve is set for the maximum speed. Fig. 12 is a broken plan view of Fig. 10. Fig. 13 is a detailed view of the free end of the circuit breaking lever disclosing the resilient spring contacts thereon.

Referring to the drawings the numeral 1 is used to designate a suitable base that may be secured in any manner to the front or radiator of an automobile or similar vehicle.

3 is a collar to which the governor 4 is secured and 5 is the grooved collar which is raised as the speed of the governor is accelerated.

The governor 4 is driven by means of a flexible shaft 6, secured to the collar 3, which is in turn rotated by means of the pinion 7 and the gear 8 secured in the usual manner to one of the front wheels 9 of a vehicle.

The operating lever 10 is pivotally secured to a suitable standard 12 and has its outer or free end directly under the adjustable insulated sleeve 14 which is provided with the inclined seats 15, and loosely mounted upon a vertical shaft 26.

Pins 16 are secured to the circuit breaking lever 17 which is pivotally secured to the standard 18 on the insulated base 19. The free end of the circuit breaking lever 17 is provided with the resilient spring contacts 20 and 21 arranged to engage the stationary contacts 22 and 23 respectively.

The adjustable insulated sleeve 14 rests upon the end of the lever 10 and is provided with an extension 14' having slots 24 therein arranged to engage the pins 25 secured to the vertically disposed shaft 26 rotatably mounted in a suitable bearing 27 of the standard 28. The upper end of the shaft 26 has secured thereto a suitable beveled gear 29. A horizontally disposed shaft 30 has one end rotatably mounted within a suitable bearing 21 of the standard 28, the other end thereof extending rearwardly to the dash board of the vehicle where it is provided with a pointer 31 which is arranged to indicate numerals on a stationary disk 32 secured to the said dash board. The shaft 30 is also provided with a numbered disk 34 mounted within the housing 35. The front portion of the said housing 35 has an aperture 36 through which the uppermost numeral on the disk 34 is displayed.

A buzzer 40 is secured to the dash board of the vehicle and has a connection 41 to the insulated contact 22. The other side of the buzzer is grounded in the usual manner to the frame of the machine. A live connection 45 leads from the magneto, not shown, to the standard 18 to which the circuit breaking lever 17 is pivotally secured and a connection 46 leads from the contact 23 to the distributer. In other words, the circuit breaking lever 17 completes the connection between the magneto, or battery, and the distributer, not shown. From the distributer suitable connections are provided to the various spark plugs. Inasmuch as the magneto, distributer and spark plugs are no part of the present invention I have eliminated the same from the drawing.

The operation is as follows: The fly ball governor is driven by means of the collar 3 and flexible driving shaft 6, pinion 7 and gear 8 on the wheel 9. It is obvious that the speed of the governor 4 will be in the direct proportion to the speed of the wheel 9. An increase of speed of the wheel 9 will result in an acceleration of the speed of the governor 4, and the grooved collar 5 will be raised proportionately.

If it is desired that the speed of the vehicle shall not exceed say 20 miles per hour the controller is set to break the circuit between the magneto and the distributer, and also to conspicuously indicate the speed for which the said governor is set, in the following manner: The pointer 31 on the end of the shaft 30 will be turned so as to point to the numeral "20" on the stationary disk 32 on the dash board of the vehicle. As the shaft 30 is partially rotated it will in turn partially rotate the numbered disk 34 within the housing 35 and display the numeral "20" opposite the aperture 36 in the said housing 35, which is secured to the radiator in front of the vehicle, as shown in Figs. 2 and 4 of the drawings. Simultaneously the beveled pinion 30' is partially rotated by shaft 30 and in turn partially rotates the beveled gear 29 on the vertical shaft 26 to which the said gear 29 is secured. This will cause the pins 25, on shaft 26, to engage the slots 24 of the extension 14' and partially rotate the sleeve 14. As the sleeve 14 rotates it will bring that portion of the inclined seats 15 under the pins 16 which will provide a space between the said seats 15 and the said pins 16 equal to the distance that the free end of the lever 10 will be elevated when the vehicle is traveling at the rate of 20 miles per hour. We will assume, for the purpose of illustration, that the speed of the vehicle is 18 miles per hour and gradually increasing. As the speed of the vehicle increases the speed of the fly ball governor 4 will be increased accordingly and the grooved collar 5 thereon will be lifted which will in turn raise the lever 10 and the sleeve 14 loosely mounted on the shaft 26 until the inclined seats 15 of the said sleeve 14 engage the pins 16 of the circuit breaking lever 17; thereby causing the free end of the said lever 17 to raise, and the resilient spring contact 20 to engage the contact 22 before the contact 21 is released from the contact 23. As the contact 20 engages the contact 22 a portion of the current of the magneto, or battery, will flow through the line 41 to the buzzer 40. The other side of the said buzzer 40 being grounded to the magneto, an alarm will be sounded which will attract the attention of the driver to the fact that the speed of his vehicle is 20 miles per hour or the speed indicated by the pointer 31 on the disk 32 and by the numeral on the disk 34, which is displayed through the aperture 36 in the housing 35 on the front of the vehicle. If the alarm is ignored by the driver the continued increase of the speed of the vehicle will cause a corresponding increase in the speed of the governor 4 which will cause the grooved collar 5 secured thereto to raise the operating lever 10 still higher until the said lever 10 raises the circuit breaking lever 17 to a point where the contact 21 will be separated from the contact 23. This will break the circuit between the magneto and the distributer and while the motor will continue to draw in and compress gas there will be no spark to fire the compressed charge, consequently the motor will cease to drive the vehicle. In other words, when the speed of the vehicle is such that the governor 4 will raise the lever 10 and thereby the lever 17 a sufficient height, the spark will be cut out and the motor will cease to produce energy. As the vehicle is thus deprived of its power it will slow down until the governor 4 restores, through the medium of the operating lever 10, the circuit breaking lever 17 to a point where the circuit is again closed through the contacts 21 and 23 when the spark will then be cut in and the vehicle be propelled as before. The sleeve 14 is insulated so that the circuit from the line 45 will not be grounded through the lever 10 before elevating the lever 17.

It is obvious that by rotating the shaft 30, the shaft 26 and sleeve 14 will be rotated accordingly which will bring the lower portion of the inclined seats 15 on the sleeve 14 below the pins 16. The speed at which the vehicle must travel before the spark will be cut out is in direct proportion to the space between the inclined seats 15 and the pins 16. When the sleeve 14 is turned so that the upper portion of the seats 15 are directly under the pins 16 as shown in Fig. 10 of the drawings a minimum speed will lift the lever 17 and sound the alarm. By giving the shaft 26 a one-quarter revolution collar 14 will be turned so that the lower portion of the seats 15 thereon will be directly under the pins 16. Consequently the vehicle will have to travel at a high rate of speed before the governor 4 will operate the lever 10 and raise the said sleeve 14 on the end thereto a sufficient distance to bring the lower portion of the seats 15 against the pins of the circuit breaking lever 17.

It is obvious from the foregoing that I have provided improved means for breaking the spark plug circuit when the vehicle has attained a predetermined velocity, and also improved means for sounding an alarm just previous to the interruption of the spark plug circuit which will indicate to the driver of the vehicle that he has reached the speed for which the controller had been set.

I am aware that the present state of the art discloses speed controllers and indicators wherein the igniting circuit is short circuited when the vehicle reaches a predetermined speed. I therefore do not wish to claim such a combination broadly as my invention; but What I do claim as new and desire to secure by Letters Patent is—

1. A speed controller and indicator for automobiles and the like comprising an indicator secured to the front of a vehicle and arranged to indicate the speed for which the controller is set; a speed controller operatively connected to one of the wheels of the vehicle and to the indicator and adapted to interrupt the igniting circuit of a motor when the speed of the vehicle attains a predetermined speed; and means secured to the dash board of the vehicle and arranged to operate the indicator and to determine the speed at which the speed controller will be operated.

2. A speed controller and indicator for automobiles and the like comprising an indicator secured to the front of the vehicle and adapted to indicate the speed for which the controller is set; a speed controlled operatively connected to one of the wheels of the vehicle and adapted to interrupt the igniting circuit of a motor when the vehicle attains the speed indicated by the indicator; and a shaft operatively connected to the indicator, controller and to the dash board of the vehicle whereby the controller and indicator may be operated.

3. A speed controller and indicator for automobiles and the like comprising an indicator secured to the front of the vehicle and adapted to indicate the speed for which the controller is set; a speed controller operatively connected to one of the wheels of the vehicle and adapted to interrupt the igniting circuit of a motor when the vehicle attains the speed indicated by the indicator; a shaft operatively connected to the indicator, controller and to the dash board of the vehicle whereby the controller and indicator may be operated; and means secured to the dash board of the vehicle and operatively connected to that end of the shaft and arranged to indicate to the operator the speed for which the controller is set.

4. A speed controller and indicator for automobiles and the like comprising an indicator secured to the front of the vehicle and adapted to indicate the speed for which the controller is set; a speed controller operatively connected to one of the wheels of the vehicle and adapted to interrupt the igniting circuit of a motor when the vehicle attains the speed indicated by the indicator; a shaft operatively connected to the indicator, controller and to the dash board of the vehicle whereby the controller and indicator may be operated; a stationary numbered disk secured to the dash board of the vehicle and arranged to rotatably engage that end of the shaft; and a pointer secured to that end of the shaft and arranged to indicate on the stationary disk the speed for which the controller is set.

In witness whereof I have hereunto set my signature in the presence of two subscribing witnesses.

JOHN L. WHEELER.

Witnesses:
FRANK CHAFFEE,
EVERETT WILLIAMS.